(12) United States Patent
Wang et al.

(10) Patent No.: US 12,526,014 B2
(45) Date of Patent: Jan. 13, 2026

(54) COMMUNICATION METHOD AND APPARATUS

(71) Applicant: HUAWEI TECHNOLOGIES CO., LTD., Shenzhen (CN)

(72) Inventors: Bolei Wang, Shanghai (CN); Yifeng Wang, Shanghai (CN); Yingfei Diao, Shanghai (CN); Hongjie Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 46 days.

(21) Appl. No.: 18/589,563

(22) Filed: Feb. 28, 2024

(65) Prior Publication Data

US 2024/0204829 A1 Jun. 20, 2024

Related U.S. Application Data

(63) Continuation of application No. PCT/CN2022/112169, filed on Aug. 12, 2022.

(30) Foreign Application Priority Data

Aug. 31, 2021 (CN) .......................... 202111011702.6

(51) Int. Cl.
 *H04B 7/06* (2006.01)
 *H04B 7/0417* (2017.01)
(52) U.S. Cl.
 CPC ......... *H04B 7/0417* (2013.01); *H04B 7/0626* (2013.01); *H04B 7/0634* (2013.01)
(58) Field of Classification Search
 CPC ... H01Q 3/26; H04B 7/04; H04B 7/06; H04B 7/10; H04B 7/0417; H04B 7/0456;
 (Continued)

(56) References Cited

U.S. PATENT DOCUMENTS

| | | | |
|---|---|---|---|
| 2019/0089437 A1 | 3/2019 | Chen et al. | |
| 2022/0416862 A1* | 12/2022 | Long | H04B 7/10 |
| 2024/0121796 A1* | 4/2024 | Nammi | H04L 1/0009 |

FOREIGN PATENT DOCUMENTS

| | | |
|---|---|---|
| CN | 108199754 A | 6/2018 |
| CN | 112822714 A | 5/2021 |

(Continued)

OTHER PUBLICATIONS

3rd Generation Partnership Project; Technical Specification Group Radio Access Network; NR; Physical layer procedures for data (Release 16). 3GPP TS 38.214 V16.4.0 (Dec. 2020). total 169 pages.

(Continued)

*Primary Examiner* — Shawkat M Ali
(74) *Attorney, Agent, or Firm* — HAUPTMAN HAM, LLP

(57) ABSTRACT

A communication method includes receiving N pilot signals from a network device by using N channel state information (CSI) resources. The N CSI resources are in a one-to-one correspondence with the N pilot signals, N is an integer greater than or equal to 2, and the N pilot signals correspond to N mapping relationships between antenna ports of the network device and transceiver antennas of the network device, wherein at least two of the N mapping relationships between the antenna ports of the network device and the transceiver antennas of the network device are different, or the N pilot signals correspond to N inter-polarization phases, wherein at least two of the N inter-polarization phases are different. The method also includes performing channel measurement on the N CSI resources based on the corresponding pilot signals. The method further includes sending channel state information to the network device.

8 Claims, 6 Drawing Sheets

(58) Field of Classification Search
CPC .... H04B 7/0626; H04B 7/0634; H04B 17/10; H04B 17/12; H04L 1/00; H04L 1/06; H04L 5/00; H04L 5/0048; H04L 5/0057; H04L 27/26; H04L 27/28; H04W 24/08; H04W 24/10; H04W 72/04
USPC .................. 375/219, 260, 267, 295, 316
See application file for complete search history.

(56) References Cited

FOREIGN PATENT DOCUMENTS

| | | |
|---|---|---|
| EP | 3343823 A1 | 7/2018 |
| JP | 2019537874 A | 12/2019 |
| JP | 2020523885 A | 8/2020 |
| WO | 2017107697 A1 | 6/2017 |
| WO | 2018127780 A1 | 7/2018 |
| WO | 2021079173 A1 | 4/2021 |

OTHER PUBLICATIONS

3rd Generation Partnership Project; Technical Specification Group Radio Access Network; NR; Physical layer procedures for data (Release 16). 3GPP TS 38.214 V16.2.0 (Jun. 2020). total 163 pages.
International Search Report issued in corresponding International Application No. PCT/CN2022/112169, dated Oct. 27, 2022, pp. 1-9.
Japanese Office Action issued in corresponding Japanese Application No. 2024-513517, dated Feb. 25, 2025, pp. 1-6.
Extended European Search Report issued in corresponding European Application No. 22863088.5, dated Oct. 28, 2024, pp. 1-10.

* cited by examiner

| Channel | Baseline | Gain | Mapping relationship 2 | Gain | Mapping relationship 3 | Gain | Envelope | Gain |
|---|---|---|---|---|---|---|---|---|
| 1 | 12.04 | 0.00% | 10.94 | -9.20% | 12.734 | 5.74% | 12.73 | 5.74% |
| 2 | 17.12 | 0.00% | 11.43 | -33.25% | 17.062 | -0.36% | 17.12 | 0.00% |
| 3 | 17.33 | 0.00% | 17.33 | 0.00% | 17.727 | 2.29% | 17.73 | 2.29% |
| 4 | 17.02 | 0.00% | 16.73 | -1.66% | 16.95 | -0.38% | 17.02 | 0.00% |
| 5 | 18.10 | 0.00% | 18.24 | 0.77% | 17.877 | -1.22% | 18.24 | 0.77% |
| 6 | 16.23 | 0.00% | 17.15 | 5.69% | 16.34 | 0.67% | 17.15 | 5.69% |
| 7 | 17.02 | 0.00% | 15.27 | -10.28% | 17.072 | 0.32% | 17.07 | 0.32% |
| 8 | 14.59 | 0.00% | 16.14 | 10.68% | 13.876 | -4.86% | 16.14 | 10.68% |
| 9 | 14.52 | 0.00% | 16.19 | 11.54% | 13.839 | -4.68% | 16.19 | 11.54% |
| 10 | 17.78 | 0.00% | 17.10 | -3.81% | 17.104 | -3.81% | 17.78 | 0.00% |
| Average | 16.17 | 0.00% | 16.65 | -2.95% | 16.06 | -0.63% | 16.72 | 3.70% |

FIG. 6

| Channel | Baseline | Gain | Mapping relationship 2 | Gain | Mapping relationship 3 | Gain | Mapping relationship 4 | Gain | Envelope | Gain |
|---|---|---|---|---|---|---|---|---|---|---|
| 1 | 8.86 | 0.00% | 8.73 | -1.42% | 9.9605 | 12.45% | 9.9605 | 12.45% | 9.96 | 12.45% |
| 2 | 11.81 | 0.00% | 11.70 | -0.99% | 13.279 | 12.41% | 13.279 | 12.41% | 13.28 | 12.41% |
| 3 | 10.92 | 0.00% | 10.90 | -0.17% | 10.904 | -0.17% | 10.904 | -0.17% | 10.92 | 0.00% |
| 4 | 11.85 | 0.00% | 13.36 | 12.71% | 13.36 | 12.71% | 13.36 | 12.71% | 13.36 | 12.71% |
| 5 | 10.72 | 0.00% | 11.44 | 6.68% | 12.157 | 13.40% | 12.008 | 12.01% | 12.16 | 13.40% |
| 6 | 10.25 | 0.00% | 10.74 | 4.82% | 10.756 | 4.98% | 10.112 | -1.31% | 10.76 | 4.98% |
| 7 | 10.30 | 0.00% | 9.93 | -3.61% | 10.702 | 3.90% | 9.9269 | -3.62% | 10.70 | 3.90% |
| 8 | 11.72 | 0.00% | 11.41 | -2.66% | 11.36 | -3.90% | 11.358 | -3.11% | 11.72 | 0.00% |
| 9 | 10.91 | 0.00% | 11.78 | 8.01% | 11.782 | 8.01% | 11.782 | 8.01% | 11.78 | 8.01% |
| 10 | 11.47 | 0.00% | 12.35 | 7.69% | 12.469 | 8.71% | 12.408 | 8.18% | 12.47 | 8.71% |
| Average | 10.88 | 0.00% | 11.23 | 3.11% | 11.67 | 7.33% | 11.51 | 5.76% | 11.71 | 7.66% |

FIG. 7

COMMUNICATION METHOD AND APPARATUS

CROSS-REFERENCE TO RELATED APPLICATIONS

This application is a continuation of International Application No. PCT/CN2022/112169, filed on Aug. 12, 2022, which claims priority to Chinese Patent Application No. 202111011702.6, filed on Aug. 31, 2021. The disclosures of the aforementioned applications are incorporated herein by reference in these entireties.

TECHNICAL FIELD

This application relates to the field of communication technologies, and in particular, to a communication method and an apparatus.

BACKGROUND

A multiple-input and multiple-output (MIMO) technology has been widely used in wireless communication because it can effectively improve radio spectrum efficiency.

For downlink, the key for the MIMO technology to improve spectrum efficiency is that a network device can perform accurate precoding. Currently, some precoding matrices are predefined, and a set including these precoding matrices is known to both the network device and a terminal device, so that the terminal device may feed back channel state information (CSI) to the network device in a form of a precoding matrix indicator (PMI). A specific process is as follows: The network device sends a channel state information reference signal (CSI-RS) to the terminal device: the terminal device selects an optimal precoding matrix from a predefined precoding matrix set based on the received CSI-RS signal, and feeds back the CSI to the network device by using the PMI: and the network device searches for a corresponding precoding matrix based on the PMI fed back by the terminal device, and performs precoding.

However, as CSI quantization performed using the PMI is discrete and limited, there is a quantization error. Consequently, there is a large error between a precoding matrix determined by the network device based on the PMI and a precoding matrix corresponding to an actual channel. In other words, precision of feeding back the CSI by the terminal device based on the PMI is currently low.

SUMMARY

This application provides a communication method and an apparatus, to improve feedback precision of channel state information.

According to a first aspect, this application provides a communication method. The method may include: A terminal device receives N pilot signals sent by a network device by using N CSI resources, and performs channel measurement on the N CSI resources based on the corresponding pilot signals: and then the terminal device sends channel state information to the network device, where the channel state information includes an identifier of a first CSI resource and a precoding matrix indicator PMI; and where the N CSI resources are in a one-to-one correspondence with the N pilot signals, and N is an integer greater than or equal to 2: and the N pilot signals may correspond to N mapping relationships between antenna ports of the network device and transceiver antennas of the network device, where at least two of the N mapping relationships between the antenna ports of the network device and the transceiver antennas of the network device are different; or the N pilot signals may correspond to N inter-polarization phases, where at least two of the N inter-polarization phases are different: and the first CSI resource is one of the N CSI resources, and a channel measurement result corresponding to the first CSI resource is better than a channel measurement result corresponding to N−1 CSI resources of the N CSI resources other than the first CSI resource.

According to the foregoing method, different pilot signals may be sent on different CSI resources, so that there are different equivalent channels from the network device to the terminal device on the different CSI resources. The terminal device performs channel measurement on a plurality of CSI resources based on the corresponding pilot signals, so that an equivalent channel better matches a codebook. In this way, feedback precision of the channel state information can be improved, so that a precoding matrix determined by the network device better matches a channel. A plurality of corresponding pilot signals may be equivalently changed by using a plurality of mapping relationships between the antenna ports of the network device and the transceiver antennas of the network device, to change the equivalent channels from the network device to the terminal device on the different CSI resources. Alternatively, a plurality of corresponding pilot signals may be equivalently changed by using a plurality of inter-polarization phases, to change the equivalent channels from the network device to the terminal device on the different CSI resources.

In a possible design, the terminal device may receive configuration information from the network device, where the configuration information is for configuring a first resource set, the first resource set includes M CSI resources, the M CSI resources include the N CSI resources, and M is an integer greater than or equal to N. In this way, the network device can send the plurality of pilot signals by using the plurality of CSI resources, so that the terminal device performs channel measurement on the plurality of CSI resources based on the corresponding pilot signal.

According to a second aspect, this application provides a communication method. The method may include: after sending N pilot signals to a terminal device by using N CSI resources, a network device receives channel state information sent by the terminal device, where the channel state information includes an identifier of a first CSI resource and a precoding matrix indicator PMI; and then determines a precoding matrix based on the identifier of the first CSI resource and the PMI that are included in the channel state information. The N CSI resources are in a one-to-one correspondence with the N pilot signals, and N is an integer greater than or equal to 2. The N pilot signals may correspond to N mapping relationships between antenna ports of the network device and transceiver antennas of the network device, where at least two of the N mapping relationships between the antenna ports of the network device and the transceiver antennas of the network device are different: or the N pilot signals may correspond to N inter-polarization phases, where at least two of the N inter-polarization phases are different. The first CSI resource is one of the N CSI resources, and a channel measurement result corresponding to the first CSI resource is better than a channel measurement result corresponding to N−1 CSI resources of the N CSI resources other than the first CSI resource.

According to the foregoing method, different pilot signals may be sent on different CSI resources, so that there are different equivalent channels from the network device to the terminal device on the different CSI resources. The terminal device performs channel measurement on a plurality of CSI resources based on the corresponding pilot signals, so that an equivalent channel better matches a codebook. In this way, feedback precision of the channel state information can be improved, so that a precoding matrix determined by the network device better matches a channel. A plurality of corresponding pilot signals may be equivalently changed by using a plurality of mapping relationships between the antenna ports of the network device and the transceiver antennas of the network device, to change the equivalent channels from the network device to the terminal device on the different CSI resources. Alternatively, a plurality of corresponding pilot signals may be equivalently changed by using a plurality of inter-polarization phases, to change the equivalent channels from the network device to the terminal device on the different CSI resources.

In a possible design, a method for determining, by the network device, a precoding matrix based on the identifier of the first CSI resource and the PMI that are included in the channel state information may be: The network device determines a first mapping relationship based on the identifier of the first CSI resource, and determines the precoding matrix based on the first mapping relationship and the PMI, where the first mapping relationship is one of the N mapping relationships between the antenna ports of the network device and the transceiver antennas of the network device. In this way, the network device may determine, with reference to the first mapping relationship and the PMI, a precoding matrix that better matches a channel.

In a possible design, a method for determining, by the network device, a first mapping relationship based on the identifier of the first CSI resource may be: The network device determines the first CSI resource based on the identifier of the first CSI resource, and further determines the first mapping relationship corresponding to the first CSI resource. In this way, the network device can accurately determine the first mapping relationship.

In a possible design, a method for determining, by the network device, the precoding matrix based on the first mapping relationship and the PMI may be: The network device determines a first matrix based on the first mapping relationship, and determines a to-be-selected precoding matrix in a first codebook based on the PMI, where the first matrix represents the first mapping relationship, and the first codebook is a preset precoding matrix set: and finally the network device determines the precoding matrix based on the first matrix and the to-be-selected precoding matrix. In this way, diversified beams can be constructed by combining different matrices corresponding to different mapping relationships with the first codebook, and protocol limitation of an existing codebook is broken. In this way, feedback precision of channel state information can be improved, so that the precoding matrix determined by the network device better matches a channel.

In a possible design, a method for determining, by the network device, a precoding matrix based on the identifier of the first CSI resource and the PMI that are included in the channel state information may be: The network device determines a first inter-polarization phase based on the identifier of the first CSI resource, and determines the precoding matrix based on the first inter-polarization phase and the PMI, where the first inter-polarization phase is one of the N inter-polarization phases. In this way, the network device may determine, with reference to the first inter-polarization phase and the PMI, a precoding matrix that better matches a channel.

In a possible design, a method for determining, by the network device, a first inter-polarization phase based on the identifier of the first CSI resource may be: The network device determines the first CSI resource based on the identifier of the first CSI resource, and further determines the first inter-polarization phase corresponding to the first CSI resource. In this way, the network device can accurately determine the first inter-polarization phase.

In a possible design, a method for determining, by the network device, the precoding matrix based on the first inter-polarization phase and the PMI may be: The network device determines a second matrix based on the first inter-polarization phase, and determines a to-be-selected precoding matrix in a first codebook based on the PMI, where the second matrix represents the first inter-polarization phase, and the first codebook is a preset precoding matrix set: and finally the network device determines the precoding matrix based on the second matrix and the to-be-selected precoding matrix. In this way, a value of an inter-polarization phase can be extended, and codebook limitation of the existing protocol is broken. In this way, the feedback precision of the channel state information can be improved, so that the precoding matrix determined by the network device better matches the channel.

In a possible design, the network device sends configuration information to the terminal device, where the configuration information is for configuring a first resource set, the first resource set includes M CSI resources, the M CSI resources include the N CSI resources, and M is an integer greater than or equal to N. In this way, the network device can send the plurality of pilot signals by using the plurality of CSI resources, so that the terminal device performs channel measurement on the plurality of CSI resources based on the corresponding pilot signal.

According to a third aspect, this application further provides a communication apparatus. The communication apparatus may be a terminal device. The communication apparatus has a function of implementing the method in the foregoing first aspect or the possible design examples of the first aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions in the foregoing first aspect or the possible design examples of the first aspect. For details, refer to detailed descriptions in the method examples. Details are not described herein again.

In a possible design, a structure of the communication apparatus includes a transceiver and a processor, and optionally, further includes a memory. The transceiver is configured to receive and send data, and is configured to communicate and interact with another device in a communication system. The processor is configured to support the communication apparatus in performing corresponding functions in the foregoing first aspect or the possible design examples of the first aspect. The memory is coupled to the processor, and stores program instructions and data for the communication apparatus.

According to a fourth aspect, this application further provides a communication apparatus. The communication apparatus may be a network device. The communication apparatus has a function of implementing the method in the foregoing second aspect or the possible design examples of the second aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions in the foregoing second aspect or the possible design examples of the second aspect. For details, refer to detailed descriptions in the method examples. Details are not described herein again.

In a possible design, a structure of the communication apparatus includes a transceiver and a processor, and optionally, further includes a memory. The transceiver is configured to receive and send data, and is configured to communicate and interact with another device in a communication system. The processor is configured to support the communication apparatus in performing corresponding functions in the foregoing second aspect or the possible design examples of the second aspect. The memory is coupled to the processor, and stores program instructions and data for the communication apparatus.

According to a fifth aspect, an embodiment of this application provides a communication system. The communication system may include the terminal device and the network device mentioned above.

According to a sixth aspect, an embodiment of this application provides a computer-readable storage medium. The computer-readable storage medium stores program instructions, and when the program instructions are run on a computer, the computer is enabled to perform the method in any one of the first aspect and the possible designs of the first aspect or in any one of the second aspect and the possible designs of the second aspect in embodiments of this application. For example, the computer-readable storage medium may be any usable medium that can be accessed by a computer. By way of example rather than limitation, the computer-readable medium may include a non-transitory computer-readable medium, a random-access memory (RAM), a read-only memory (ROM), an electrically erasable programmable read-only memory (EEPROM), a CD-ROM or another optical disk storage, a magnetic disk storage medium or another magnetic storage device, or any other medium that can be configured to carry or store expected program code in a form of an instruction or a data structure and that can be accessed by the computer.

According to a seventh aspect, an embodiment of this application provides a computer program product including computer program code or instructions. When the computer program product runs on a computer, the computer is enabled to implement the method in any one of the foregoing first aspect or the possible designs of the first aspect, or in any one of the foregoing second aspect or the possible designs of the second aspect.

According to an eighth aspect, this application further provides a chip, including a processor. The processor is coupled to a memory, and is configured to read and execute program instructions stored in the memory, so that the chip implements the method in any one of the foregoing first aspect or the possible designs of the first aspect, or in any one of the foregoing second aspect or the possible designs of the second aspect.

For each of the third aspect to the eighth aspect and technical effects achievable by the aspect, refer to the foregoing descriptions of the technical effects achievable in the first aspect or the possible solutions in the first aspect, or in the second aspect or the possible solutions in the second aspect. Details are not described herein again.

BRIEF DESCRIPTION OF DRAWINGS

FIG. 6 is a schematic diagram of a simulation result according to this application:

FIG. 7 is another schematic diagram of a simulation result according to this application:

DESCRIPTION OF EMBODIMENTS

The following further describes in detail this application with reference to accompanying drawings.

Embodiments of this application provide a communication method and an apparatus, to improve feedback precision of channel state information. The method and the apparatus of this application are based on a same technical concept. Because the method and the apparatus have similar problem-resolving principles, mutual reference may be made between apparatus implementations and method implementations. Repeated descriptions are not provided.

The following explains and describes some terms in this application, to help persons skilled in the art have a better understanding.

(1) Channel state information reference signal (CSI-RS): In protocol standards, a network device may obtain, by sending the CSI-RS, channel state information (CSI) fed back by a terminal device, and further determine a precoding matrix that adapts to a downlink channel.

(2) CSI-RS resource identifier (CRI): The CRI indicates a CSI-RS resource index number corresponding to the channel state information fed back by the terminal device.

(3) Antenna port: The antenna port is a logical antenna port, that is, an antenna port, and is a logical port used for transmission. There is no defined one-to-one correspondence between the antenna port and a physical antenna, and the antenna port is a virtual representation of the physical antenna. Mapping of the antenna port to the physical antenna is controlled through beamforming. Because some beams need to transmit signals on some antenna ports to form required beams, it is possible to map two antenna ports to one physical antenna, or map one antenna port to a plurality of physical antennas.

In addition, in descriptions of this application, terms such as "first" and "second" are merely used for distinction and description, but should not be understood as an indication or implication of relative importance, or as an indication or implication of an order.

In the descriptions in this application, "at least one (type)" refers to one or more (types), and "a plurality of (types)" refers to two or more (types).

To describe technical solutions in embodiments of this application more clearly, the following describes the communication method and the apparatus according to embodiments of this application in detail with reference to the accompanying drawings.

Figure 1:
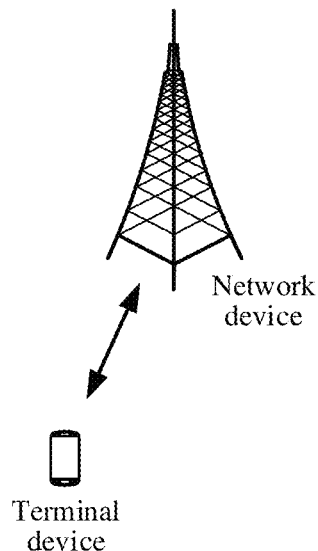
FIG. 1 is a schematic diagram of an architecture of a communication system according to this application.

FIG. 1 shows an architecture of a communication system to which a communication method according to an embodiment of this application is applicable. The architecture of the communication system includes a network device and a terminal device.

The network device is a device that has wireless transceiver function or a chip that can be disposed in the network device. The network device includes but not limited to a base station (gNB), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (transmission and reception point, TRP, or TP), and the like. The network device may be alternatively a network node that constitutes a gNB or a transmission point, for example, a baseband unit (BBU), or a distributed unit (DU).

In some deployments, the gNB may include a central unit (CU) and the DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling such as RRC layer signaling or PDCP layer signaling may also be considered as being sent by the DU or sent by the DU and the RU. It may be understood that the network device may be a CU node, a DU node, or a device including a CU node and a DU node. In addition, the CU may be classified as a network device in an access network RAN or a network device in a core network CN. This is not limited.

The terminal device may be referred to as user equipment (UE), an access terminal, a subscriber unit, a subscriber station, a mobile station, a remote terminal, a mobile device, a user terminal, a terminal, a wireless communication device, a user agent, a user apparatus, or the like. The terminal device has a measurement capability for a plurality of CSI resources. The terminal device in embodiments of this application may be a mobile phone, a tablet computer (Pad), a computer that has wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a smart wearable device (such as smart glasses, a smart watch, or a smart headset), a wireless terminal in a smart home, or the like. The terminal device may alternatively be a chip, a chip module (or a chip system), or the like that can be disposed in the foregoing device. An application scenario is not limited in embodiments of this application. In this application, a terminal device that has a wireless transceiver function and a chip that may be disposed in the terminal device are collectively referred to as a terminal device.

It should be noted that the communication system shown in FIG. 1 may be but not limited to a 4th generation (4G) system or a 5th generation (5G) system. Optionally, the method in embodiments of this application is further applicable to various future communication systems, for example, a 6th generation (6G) system or another communication network.

It should be noted that quantities of network devices and terminal devices in the communication system shown in FIG. 1 are merely examples, and are not intended to limit the communication system. The communication system shown in FIG. 1 may further include another type of device, for example, a core network device, which is not shown in FIG. 1.

It should be noted that, in embodiments of this application, feedback of the channel state information may be implemented by the terminal device, a processor, a chip or a chip system, a functional module, or the like in the terminal device. Precoding may be performed based on the channel state information by the network device, a processor, a chip or a chip system, a functional module, or the like in the network device. In the following embodiments, only the terminal device and the network device are used as examples to describe in detail the communication method provided in this application, but this application is not limited thereto.

Figure 2:
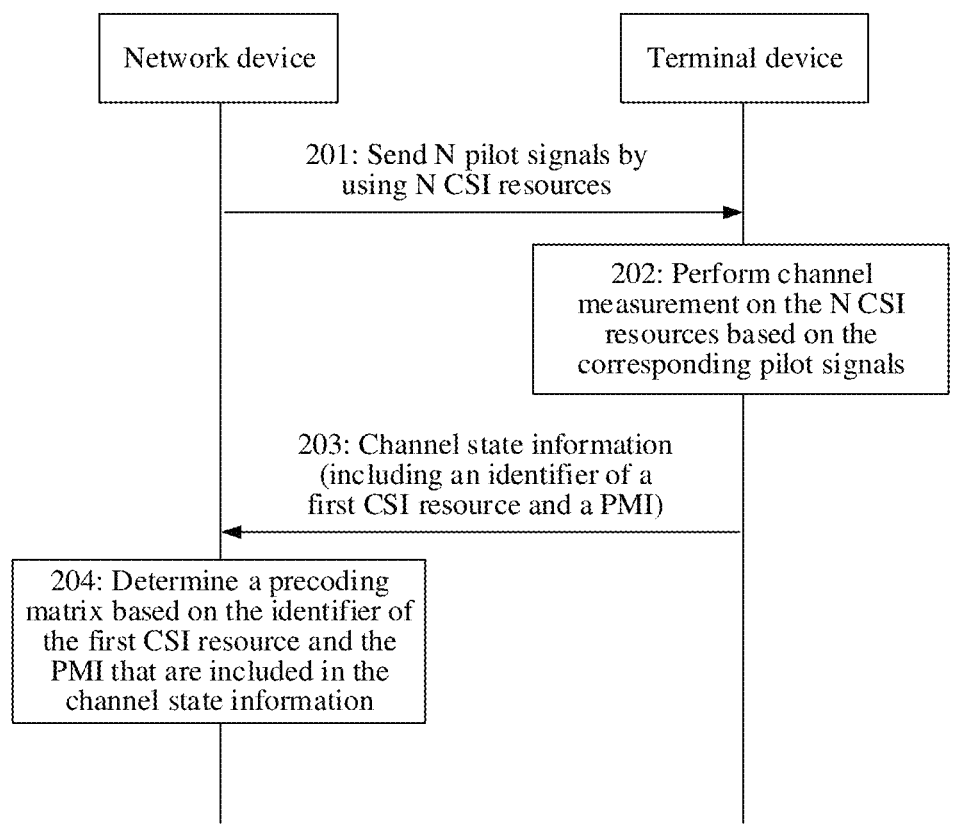
FIG. 2 is a flowchart of a communication method according to this application.

Based on the foregoing descriptions, a communication method provided in an embodiment of this application is applicable to the communication system shown in FIG. 1. Refer to FIG. 2. A procedure of the method may include the following steps.

Step 201: A network device sends N pilot signals to a terminal device by using N CSI resources, and correspondingly, the terminal device receives the N pilot signals that are sent by the network device by using the N CSI resources. The N CSI resources are in a one-to-one correspondence with the N pilot signals, and N is an integer greater than or equal to 2.

In other words, in step 201, the network device respectively sends one pilot signal on each of the N CSI resources. Optionally, when the network device implements the sending of the foregoing N pilot signals, the sending of the foregoing N pilot signals is implemented by using a physical layer (that is, a layer 1 (L1)) of the network device.

For example, the N pilot signals are N channel state information reference signals (CSI-RSs).

In a first optional implementation, the N pilot signals correspond to N mapping relationships between antenna ports of the network device and transceiver antennas of the network device, where at least two of the N mapping relationships between the antenna ports of the network device and the transceiver antennas of the network device are different. This case may also be understood as that the N CSI resources correspond to the N mapping relationships between the antenna ports of the network device and the transceiver antennas of the network device.

Each mapping relationship may correspond to one matrix, and a corresponding mapping relationship is represented by using a corresponding matrix.

For example, a network device that has four transceiver antennas and four antenna ports is used as an example. It is assumed that N is 4, in other words, when there are four CSI resources, mapping relationships (a mapping relationship 1, a mapping relationship 2, a mapping relationship 3, and a mapping relationship 4) between the antenna ports of the network device and the transceiver antennas of the network device respectively corresponding to the four CSI resources (for example, a CSI resource 1, a CSI resource 2, a CSI resource 3, and a CSI resource 4) may be shown in FIG. 3. Further, a matrix 1 to a matrix 4 respectively corresponding to the mapping relationship 1 to the mapping relationship 4 may be shown as matrices shown in FIG. 3.

Figure 3:
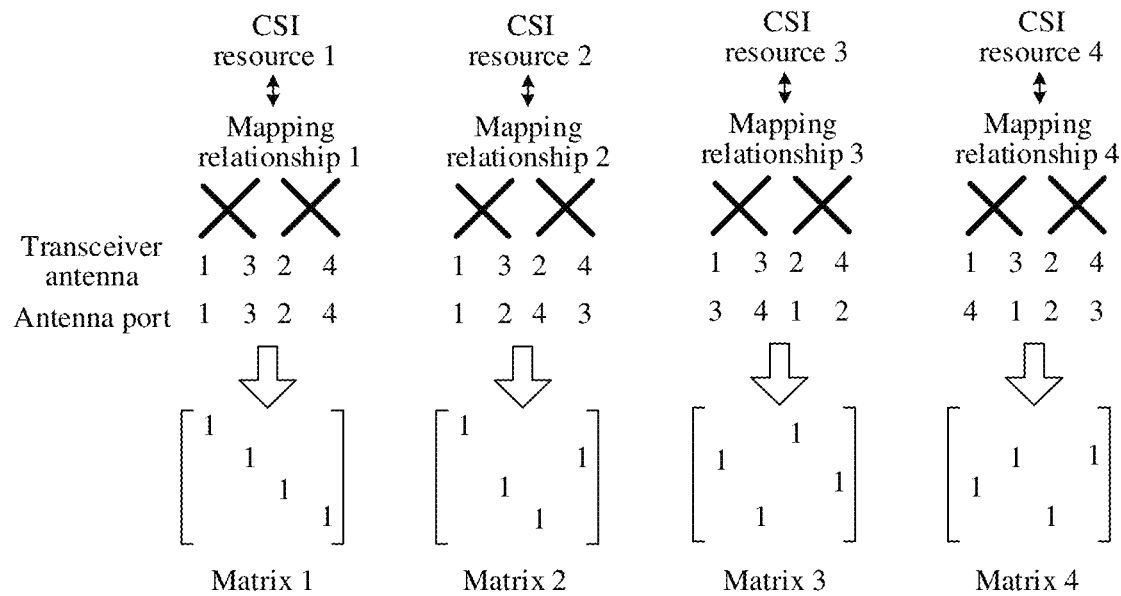
FIG. 3 is a schematic diagram of a mapping relationship between an antenna port of a network device and a transceiver antenna of the network device according to this application.

It should be noted that the mapping relationships and the matrices shown in FIG. 3 are merely examples, and there may be other possibilities. This is not limited in this application. It should be noted that, other elements that are not marked in the matrix in the accompanying drawings of this application are 0s.

For example, one of the N mapping relationships corresponding to the N CSI resources may be configured as a baseline. For example, the mapping relationship 1 in FIG. 3 may be configured as the baseline. In this way, the possible problem of negative gains can be avoided.

In a second optional implementation, the N pilot signals correspond to N inter-polarization phases, where at least two of the N inter-polarization phases are different. This case may also be understood as that the N CSI resources correspond to the N inter-polarization phases.

Each inter-polarization phase may be represented by using one matrix, that is, one inter-polarization phase corresponds to one matrix.

Figure 4:
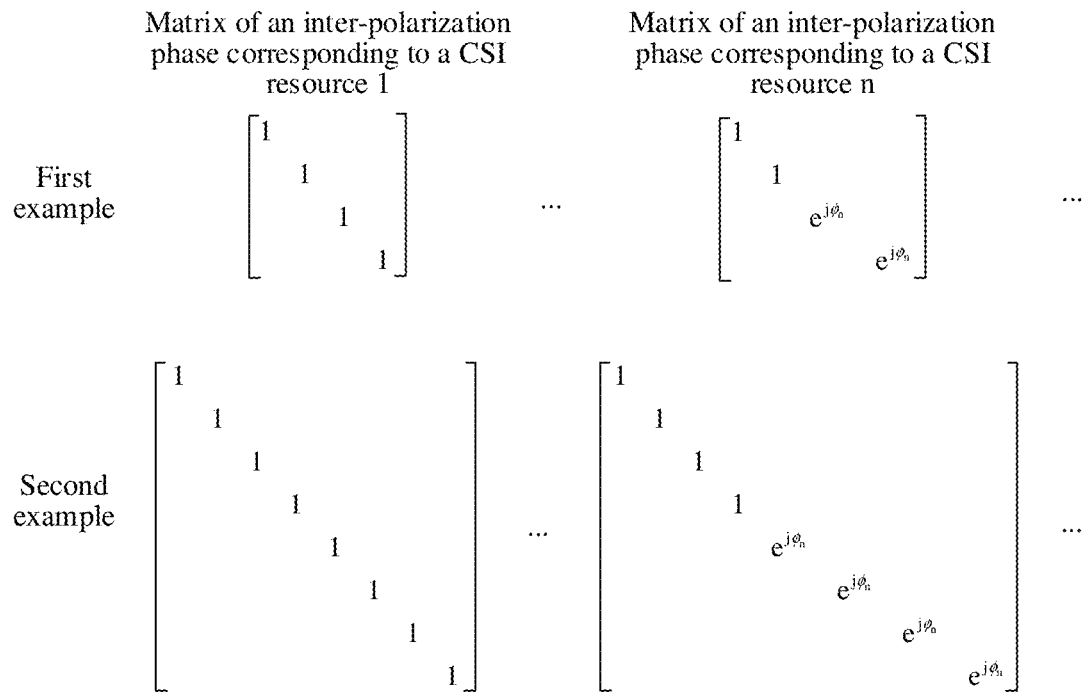
FIG. 4 is a schematic diagram of a matrix of an inter-polarization phase according to an embodiment of this application.

For example, when the network device is a network device that has four transceiver antennas and four antenna ports, matrices of inter-polarization phases corresponding to the N CSI resources may be shown in a first example in FIG. 4. When the network device is a network device that has eight transceiver antennas and eight antenna ports, matrices of inter-polarization phases corresponding to the N CSI resources may be shown in a second example in FIG. 4. It can be learned from FIG. 4 that an inter-polarization phase corresponding to a CSI resource n is $\phi_n$, where n is any integer from 1 to N, and $\phi_1$ is 0.

For example, a matrix of one of the N inter-polarization phases corresponding to the N CSI resources may be configured as a baseline. For example, a matrix of an inter-polarization phase corresponding to a CSI resource 1 in FIG. 4 may be configured as the baseline. In this way, a possible negative gain problem can be avoided, and complexity can be reduced.

Optionally, the solutions in the foregoing first optional implementation and the foregoing second optional implementation may be combined, and details are not described herein again.

In an example manner, before step 201, the network device may first send configuration information to the terminal device, where the configuration information is for configuring a first resource set (CSI resource set), the first resource set includes M CSI resources, the M CSI resources include the N CSI resources, and M is an integer greater than or equal to N. In this way, the terminal device can learn of the N CSI resources in advance.

The configuration information may be for configuring a plurality of resource sets including the first resource set, and a plurality of CSI resources are configured in each resource set. In other words, the configuration information may be for configuring another resource set other than the first resource set. It should be noted that, when the configuration information is for configuring the plurality of resource sets, quantities of CSI resources included in the plurality of resource sets may be different, or may be the same, or may be partially the same and partially different. This is not limited in this application.

For example, the first resource set may be a cell-level resource set, or may be a terminal device-level resource set. When the first resource set is the cell-level resource set, the first resource set is valid for all terminal devices in a cell, and different terminals in the cell may be configured to use a universal set or a subset of CSI resources in a same first resource set or different first resource sets. When the first resource set is the terminal device-level resource set, the first resource set is valid for one or more terminal devices. It should be understood that another resource set is similar to the first resource set, and details are not described herein again.

The network device may implement configuration of the foregoing resource set by using, but not limited to, a link layer (layer 2 (L2)) and a network layer (layer 3 (L3)) of the network device.

Step 202: The terminal device performs channel measurement on the N CSI resources based on the corresponding pilot signals.

The terminal device performs channel measurement on each CSI resource based on the pilot signal corresponding to the CSI resource, to obtain channel measurement results corresponding to the N CSI resources.

Step 203: The terminal device sends channel state information to the network device, and correspondingly, the network device receives the channel state information sent by the terminal device. The channel state information includes an identifier of a first CSI resource and a PMI, the first CSI resource is one of the N CSI resources, and a channel measurement result corresponding to the first CSI resource is better than a channel measurement result corresponding to N−1 CSI resources of the N CSI resources other than the first CSI resource. In other words, the channel measurement result corresponding to the first CSI resource is optimal in the channel measurement results corresponding to the N CSI resources.

The identifier of the first CSI resource is a CRI of the first CSI resource in the first resource set.

Step 204: The network device determines a precoding matrix based on the identifier of the first CSI resource and the PMI that are included in the channel state information.

In the first optional implementation in step 201, a method for determining, by the network device, a precoding matrix based on the identifier of the first CSI resource and the PMI that are included in the channel state information may be: The network device determines a first mapping relationship based on the identifier of the first CSI resource, and then the network device determines the precoding matrix based on the first mapping relationship and the PMI, where the first mapping relationship is one of the N mapping relationships between the antenna ports of the network device and the transceiver antennas of the network device.

For example, a method for determining, by the network device, a first mapping relationship based on the identifier of the first CSI resource may be: The network device determines the first CSI resource based on the identifier of the first CSI resource, and determines the first mapping relationship corresponding to the first CSI resource. For example, when the network device is a network device that has four transceiver antennas and four antenna ports, the first mapping relationship may be one of the four mapping relationships shown in FIG. 3.

Further, a method for determining, by the network device, the precoding matrix based on the first mapping relationship and the PMI may be: The network device determines a first matrix based on the first mapping relationship, and determines a to-be-selected precoding matrix in a first codebook based on the PMI, where the first matrix represents the first mapping relationship, and the first codebook is a preset precoding matrix set: and finally the network device determines the precoding matrix based on the first matrix and the to-be-selected precoding matrix. For example, when the network device is a network device that has four transceiver antennas and four antenna ports, the first matrix may be one of the four matrices shown in FIG. 3.

For example, when the network device determines the precoding matrix based on the first matrix and the to-be-selected precoding matrix, the network device may multiply the first matrix by the to-be-selected precoding matrix to obtain the precoding matrix.

According to the foregoing method, diversified beams can be constructed by combining different matrices corresponding to different mapping relationships with the first codebook, and protocol limitation of an existing codebook is broken. In this way, feedback precision of channel state information can be improved, so that the precoding matrix determined by the network device better matches a channel.

Figure 5:
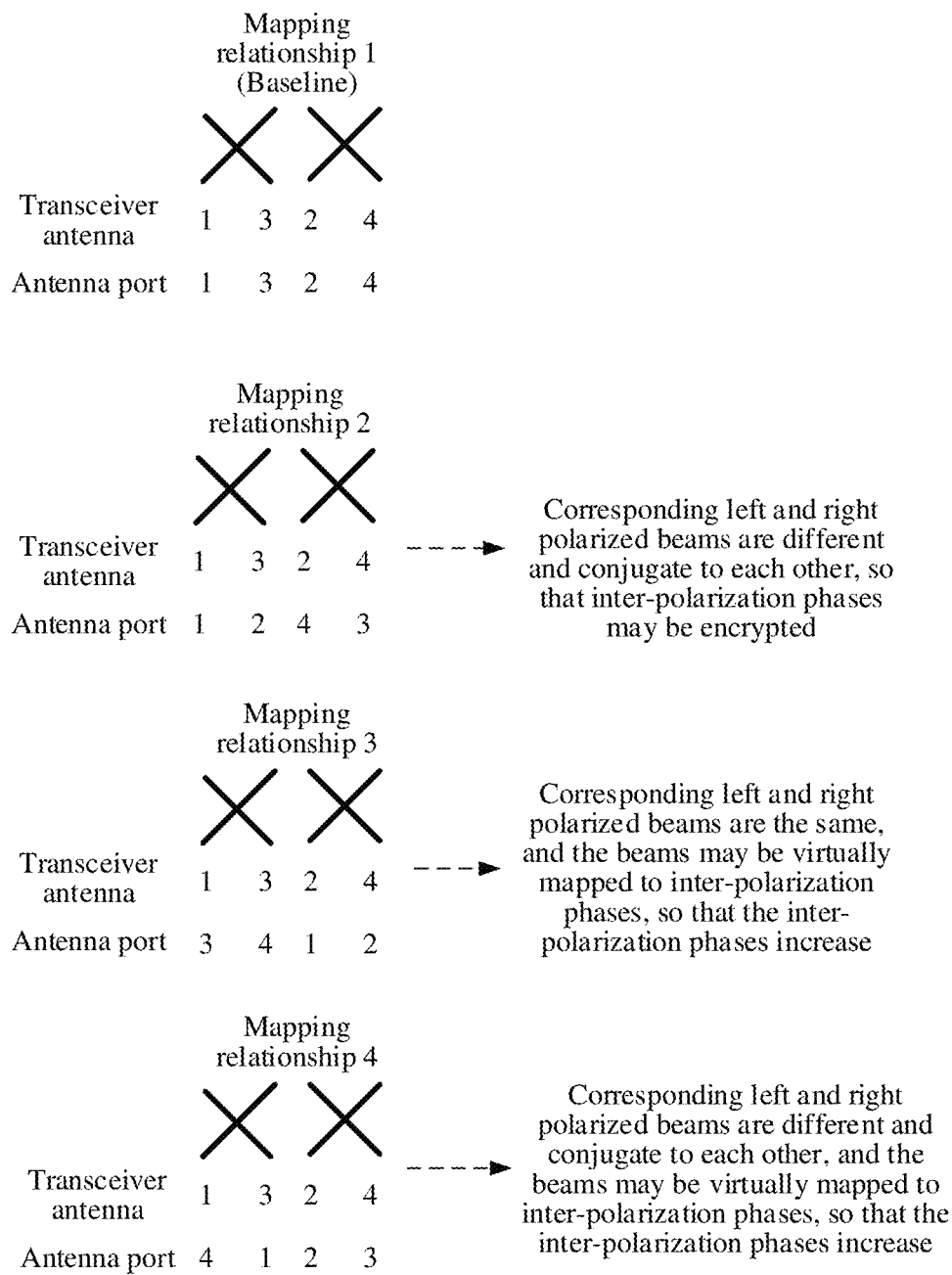
FIG. 5 is a schematic diagram of advantageous effects achieved by a beam constructed by combining a matrix corresponding to a mapping relationship with a codebook according to this application.

For example, when the network device is a network device that has four transceiver antennas and four antenna ports, in the four mapping relationships shown in FIG. 3, the mapping relationship 1 is used as a baseline (that is, the antenna ports of the network device and the transceiver antennas of the network device are not rearranged), and respective beneficial effects of beams constructed by combining matrices corresponding to the mapping relationship 2 to the mapping relationship 4 with a codebook may be shown in FIG. 5. When the mapping relationship 2 is used, corresponding left and right polarized beams are different and conjugate to each other, so that inter-polarization phases may be encrypted. For example, the inter-polarization phases may be {0°, 45°, 90°, 135°, 180°, 215°, 270°, 315° }. When the mapping relationship 3 is used, corresponding left and right polarized beams are the same, and the beams may be virtually mapped to inter-polarization phases, so that the inter-polarization phases increase. When the mapping relationship 4 is used, corresponding left and right polarized beams are different and conjugate to each other, and the beams may be virtually mapped to inter-polarization phases, so that the inter-polarization phases increase. According to the foregoing method of effect, the protocol limitation of the existing codebook can be broken. In this way, the feedback precision of the channel state information can be improved, so that the precoding matrix determined by the network device better matches the channel. In addition, a final precoding matrix determined by the network device has no negative gain compared with the baseline.

In the second optional implementation in step 201, a method for determining, by the network device, a precoding matrix based on the identifier of the first CSI resource and the PMI that are included in the channel state information may be: The network device determines a first inter-polarization phase based on the identifier of the first CSI resource, and determines the precoding matrix based on the first inter-polarization phase and the PMI, where the first inter-polarization phase is one of the N inter-polarization phases.

For example, a method for determining, by the network device, a first inter-polarization phase based on the identifier of the first CSI resource may be: The network device determines the first CSI resource based on the identifier of the first CSI resource, and further determines the first inter-polarization phase corresponding to the first CSI resource. For example, when the network device is a network device that has four transceiver antennas and four antenna ports, the first inter-polarization phase may be one of a plurality of related inter-polarization phases in a first example shown in FIG. 4. When the network device is a network device that has eight transceiver antennas and eight antenna ports, the first inter-polarization phase may be one of a plurality of related inter-polarization phases in a second example shown in FIG. 4.

Further, a method for determining, by the network device, the precoding matrix based on the first inter-polarization phase and the PMI may be: The network device determines a second matrix based on the first inter-polarization phase, and determines a to-be-selected precoding matrix in a first codebook based on the PMI, where the second matrix represents the first inter-polarization phase: and finally the network device determines the precoding matrix based on the second matrix and the to-be-selected precoding matrix. For example, when the network device is a network device that has four transceiver antennas and four antenna ports, the second matrix may be one of the matrices shown in a first example in FIG. 4. When the network device is a network device that has eight transceiver antennas and eight antenna ports, the second matrix may be one of the matrices shown in a second example in FIG. 4.

According to the foregoing method, a value of an inter-polarization phase may be extended through inter-polarization phase rotation. For example, values of the inter-polarization phases may be {0°, 45°, 90°, 135°, 180°, 215°, 270°, 315° }, and the protocol limitation of the existing codebook is broken. In this way, the feedback precision of the channel state information can be improved, so that the precoding matrix determined by the network device better matches the channel.

According to the communication method in this embodiment of this application, equivalent channels from the network device to the terminal device on different CSI resources may be changed by using the plurality of CSI resources and a plurality of pilot signals. The terminal device performs channel measurement on the plurality of CSI resources based on the corresponding pilot signals, so that an equivalent channel better matches a codebook. In this way, the feedback precision of the channel state information can be improved, so that the precoding matrix determined by the network device better matches the channel.

Based on the communication method provided in this embodiment of this application, a small amount of resource overheads of CSI resources may be used to enhance the feedback precision of the channel state information, and a throughput gain greater than the resource overheads can be obtained. The following uses an example in which different pilot signals correspond to simulation results in different mapping relationships between antenna ports of a network device and transceiver antennas of the network device for simple description. For example, the channel simulation results shown in FIG. 6 and FIG. 7 show schematic throughput gains. FIG. 6 and FIG. 7 are described by using an example in which a network device has four antenna ports and four transceiver antennas. An example in which mapping relationships between the antenna ports of the network device and the transceiver antennas of the network device are the mapping relationships shown in FIG. 3 is used for description. The mapping relationship 1 in FIG. 3 is used as a baseline for description. In FIG. 6, simulation results in the mapping relationship 1 to the mapping relationship 3 shown in FIG. 3 are used as an example for description. In FIG. 7, simulation results in the mapping relationship 1 to the mapping relationship 4 shown in FIG. 3 are used as an example for description. In FIG. 6, an example in which a fixed signal to noise ratio (SNR) whose transmission layer or rank is 3 is used for description. In FIG. 7, an example in which a fixed SNR whose transmission layer is 2 is used for description. FIG. 6 and FIG. 7 show downlink throughput gains ranging from 2% to 15% and average gains ranging from 3% to 6% under different channel conditions. Therefore, it can be learned that a large downlink throughput gain may be obtained by using the communication method provided in this embodiment of this application.

Figure 8:
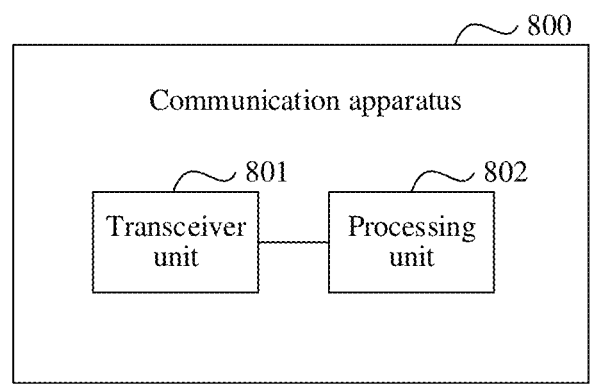
FIG. 8 is a schematic diagram of a structure of a communication apparatus according to this application.

Based on the foregoing embodiments, an embodiment of this application further provides a communication apparatus. Refer to FIG. 8. The communication apparatus 800 may include a transceiver unit 801 and a processing unit 802. The transceiver unit 801 is configured for the communication apparatus 800 to receive information (a signal, a message or data) or send information (a signal, a message or data), and the processing unit 802 is configured to control and manage an action of the communication apparatus 800. The processing unit 802 may further control a step performed by the transceiver unit 801.

For example, the communication apparatus 800 may be the terminal device in the foregoing embodiments, or a processor, a chip, a chip system, a functional module, or the like in the terminal device. Alternatively, the communication apparatus 800 may be the network device in the foregoing embodiments, or a processor, a chip, a chip system, a functional module, or the like in the network device.

In an embodiment, when the communication apparatus 800 is configured to implement a function of the terminal device in the foregoing embodiment in FIG. 2, the transceiver unit 801 may be configured to receive N pilot signals sent by the network device by using N channel state information CSI resources, where the N CSI resources are in a one-to-one correspondence with the N pilot signals, and N is an integer greater than or equal to 2: the processing unit 802 may be configured to perform channel measurement on the N CSI resources based on the corresponding pilot signals: and the N pilot signals may correspond to N mapping relationships between antenna ports of the network device and transceiver antennas of the network device, where at least two of the N mapping relationships between the antenna ports of the network device and the transceiver antennas of the network device are different: or the N pilot signals may correspond to N inter-polarization phases, where at least two of the N inter-polarization phases are different. The transceiver unit 801 may be further configured to send channel state information to the network device, where the channel state information includes an identifier of a first CSI resource and a precoding matrix indicator PMI; and the first CSI resource is one of the N CSI resources, and a channel measurement result corresponding to the first CSI resource is better than a channel measurement result corresponding to N−1 CSI resources of the N CSI resources other than the first CSI resource.

For example, the transceiver unit 801 may be further configured to receive configuration information from the network device, where the configuration information is for configuring a first resource set, the first resource set includes M CSI resources, the M CSI resources include the N CSI resources, and M is an integer greater than or equal to N.

In another embodiment, when the communication apparatus 800 is configured to implement a function of the network device in the foregoing embodiment in FIG. 2, the transceiver unit 801 may be configured to send N pilot signals to the terminal device by using N channel state information CSI resources, where the N CSI resources are in a one-to-one correspondence with the N pilot signals, and N is an integer greater than or equal to 2: and the N pilot signals may correspond to N mapping relationships between antenna ports of the network device and transceiver antennas of the network device, where at least two of the N mapping relationships between the antenna ports of the network device and the transceiver antennas of the network device are different: or the N pilot signals may correspond to N inter-polarization phases, where at least two of the N inter-polarization phases are different: and receive channel state information sent by the terminal device, where the channel state information includes an identifier of a first CSI resource and a precoding matrix indicator PMI: and the first CSI resource is one of the N CSI resources, and a channel measurement result corresponding to the first CSI resource is better than a channel measurement result corresponding to N−1 CSI resources of the N CSI resources other than the first CSI resource. The processing unit 802 may be configured to determine a precoding matrix based on the identifier of the first CSI resource and the PMI that are included in the channel state information.

In an example, when the N pilot signals correspond to the N mapping relationships between the antenna ports of the network device and the transceiver antennas of the network device, when determining the precoding matrix based on the identifier of the first CSI resource and the PMI that are included in the channel state information, the processing unit 802 may be configured to: determine a first mapping relationship based on the identifier of the first CSI resource, where the first mapping relationship is one of the N mapping relationships between the antenna ports of the network device and the transceiver antennas of the network device: and determine the precoding matrix based on the first mapping relationship and the PMI.

For example, when determining the first mapping relationship based on the identifier of the first CSI resource, the processing unit 802 may be configured to: determine the first CSI resource based on the identifier of the first CSI resource: and determine the first mapping relationship corresponding to the first CSI resource.

Further, when determining the precoding matrix based on the first mapping relationship and the PMI, the processing unit 802 may be configured to: determine a first matrix based on the first mapping relationship, where the first matrix represents the first mapping relationship: determine a to-be-selected precoding matrix in a first codebook based on the PMI, where the first codebook is a preset precoding matrix set: and determine the precoding matrix based on the first matrix and the to-be-selected precoding matrix.

In another example, when the N pilot signals correspond to N inter-polarization phases, when determining a precoding matrix based on the identifier of the first CSI resource and the PMI that are included in the channel state information, the processing unit 802 may be configured to: determine a first inter-polarization phase based on the identifier of the first CSI resource, where the first inter-polarization phase is one of the N inter-polarization phases: and determine the precoding matrix based on the first inter-polarization phase and the PMI.

For example, when determining the first inter-polarization phase based on the identifier of the first CSI resource, the processing unit 802 may be configured to: determine the first CSI resource based on the identifier of the first CSI resource: and determine the first inter-polarization phase corresponding to the first CSI resource.

Further, when determining the precoding matrix based on the first inter-polarization phase and the PMI, the processing unit 802 may be configured to: determine a second matrix based on the first inter-polarization phase, where the second matrix represents the first inter-polarization phase; determine a to-be-selected precoding matrix in a first codebook based on the PMI, where the first codebook is a preset precoding matrix set: and determine the precoding matrix based on the second matrix and the to-be-selected precoding matrix.

Optionally, the transceiver unit 801 may be further configured to send configuration information to the terminal device, where the configuration information is for configuring a first resource set, the first resource set includes M CSI resources, the M CSI resources include the N CSI resources, and M is an integer greater than or equal to N.

It should be noted that unit division in embodiments of this application is an example, and is merely logical function division. In actual implementation, there may be another division manner. In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

Figure 9:
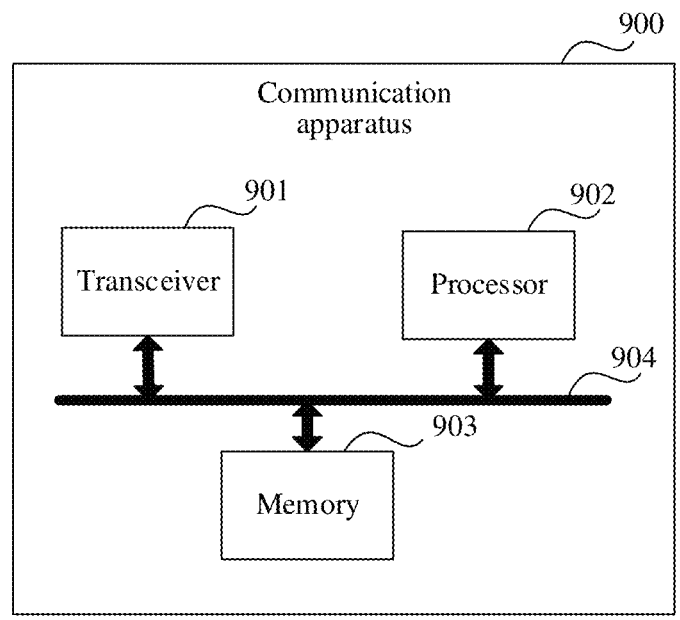
FIG. 9 is a diagram of a structure of a communication apparatus according to this application.

Based on the foregoing embodiments, an embodiment of this application further provides a communication apparatus. Refer to FIG. 9. The communication apparatus 900 may include a transceiver 901 and a processor 902. Optionally, the communication apparatus 900 may further include a memory 903. The memory 903 may be disposed inside the communication apparatus 900, or may be disposed outside the communication apparatus 900. The processor 902 may control the transceiver 901 to receive and send information, a signal, or data.

The processor 902 may be a central processing unit (central processing unit, CPU), a network processor (network processor, NP), or a combination of a CPU and an NP. The processor 902 may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), a generic array logic (GAL), or any combination thereof.

The transceiver 901, the processor 902, and the memory 903 are connected to each other. Optionally, the transceiver 901, the processor 902, and the memory 903 are connected to each other by using a bus 904. The bus 904 may be a peripheral component interconnect (PCI) bus, an extended industry standard architecture (EISA) bus, or the like. The bus may be classified into an address bus, a data bus, a control bus, and the like. For ease of indication, the bus is indicated by using only one thick line in FIG. 9. However, it does not indicate that there is only one bus or only one type of bus.

In an optional implementation, the memory 903 is configured to store a program and the like. The program may include program code, and the program code includes computer operation instructions. The memory 903 may include a RAM, and may further include a non-volatile memory (non-volatile memory), for example, one or more magnetic disk memories. The processor 902 executes the application program stored in the memory 903, to implement the foregoing function, so that a function of the communication apparatus 900 is implemented.

For example, the communication apparatus 900 may be the terminal device in the foregoing embodiments, or may be the network device in the foregoing embodiments.

In an embodiment, when the communication apparatus 900 implements a function of the terminal device in the embodiment shown in FIG. 2, the transceiver 901 may implement a transceiver operation performed by the terminal device in the embodiment shown in FIG. 2. The processor 902 may implement another operation other than the transceiver operation performed by the terminal device in the embodiment shown in FIG. 2. For related descriptions, refer to related descriptions in the foregoing embodiment shown in FIG. 2. Details are not described herein again.

In another embodiment, when the communication apparatus 900 implements a function of the network device in the embodiment shown in FIG. 2, the transceiver 901 may implement a transceiver operation performed by the network device in the embodiment shown in FIG. 2. The processor 902 may implement another operation other than the transceiver operation performed by the network device in the embodiment shown in FIG. 2. For related descriptions, refer to related descriptions in the foregoing embodiment shown in FIG. 2. Details are not described herein again.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

Based on the foregoing embodiments, an embodiment of this application provides a communication system. The communication system may include the terminal device, the network device, and the like in the foregoing embodiments.

An embodiment of this application further provides a computer-readable storage medium. The computer-readable storage medium is configured to store a computer program. When the computer program is executed by a computer, the computer may implement the communication method provided in the foregoing method embodiments.

An embodiment of this application further provides a computer program product. The computer program product is configured to store a computer program. When the computer program is executed by a computer, the computer may implement the communication method provided in the foregoing method embodiments.

An embodiment of this application further provides a chip including a processor. The processor is coupled to a memory, and is configured to invoke a program in the memory, so that the chip implements the communication method provided in the foregoing method embodiments.

An embodiment of this application further provides a chip. The chip is coupled to a memory, and the chip is configured to implement the communication method provided in the foregoing method embodiments.

Person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that each procedure and/or block in the flowcharts and/or the block diagrams and/or a combination of procedures and/or blocks in the flowcharts and/or the block diagrams may be implemented by using computer program instructions. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer-readable memory that can indicate the computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more procedures in the flowcharts and/or in one or more blocks in the block diagrams.

It is clearly that persons skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, performed by a terminal device, the communication method comprising:
    receiving N pilot signals from a network device by utilizing N channel state information (CSI) resources, wherein
        the N CSI resources are in a one-to-one correspondence with the N pilot signals, N is an integer greater than or equal to 2, and
        the N pilot signals correspond to N mapping relationships between antenna ports of the network device and transceiver antennas of the network device, wherein at least two of the N mapping relationships between the antenna ports of the network device and the transceiver antennas of the network device are different, or
        the N pilot signals correspond to N inter-polarization phases, wherein at least two of the N inter-polarization phases are different;
    performing channel measurement on the N CSI resources based on the corresponding pilot signals; and
    sending CSI to the network device,
    wherein
        the CSI comprises an identifier of a first CSI resource and a precoding matrix indicator (PMI),
        the first CSI resource is one of the N CSI resources,
        a channel measurement result corresponding to the first CSI resource is better than a channel measurement result corresponding to N−1 CSI resources of the N CSI resources other than the first CSI resource, and
        the identifier of the first CSI resource causes the network device to:
            determine a second matrix based on a first inter-polarization phase corresponding to the first CSI resource, wherein the second matrix represents the first inter-polarization phase;
            determine a to-be-selected precoding matrix in a first codebook based on the PMI, wherein the first codebook is a preset precoding matrix set; and
            determine a precoding matrix based on the second matrix and the to-be-selected precoding matrix.

2. The communication method according to claim 1, further comprising:
    receiving configuration information from the network device, wherein the configuration information is for configuring a first resource set, the first resource set comprises M CSI resources, the M CSI resources comprise the N CSI resources, and M is an integer greater than or equal to N.

3. A communication method, performed by a network device, the communication method comprising:
    sending N pilot signals to a terminal device by utilizing N channel state information (CSI) resources, wherein
        the N CSI resources are in a one-to-one correspondence with the N pilot signals, N is an integer greater than or equal to 2, and
        the N pilot signals correspond to N mapping relationships between antenna ports of the network device and transceiver antennas of the network device, wherein at least two of the N mapping relationships between the antenna ports of the network device and the transceiver antennas of the network device are different, or
        the N pilot signals correspond to N inter-polarization phases, wherein at least two of the N inter-polarization phases are different;
    receiving CSI sent by the terminal device, wherein the CSI comprises an identifier of a first CSI resource and a precoding matrix indicator (PMI), the first CSI resource is one of the N CSI resources, and a channel measurement result corresponding to the first CSI resource is better than a channel measurement result corresponding to N−1 CSI resources of the N CSI resources other than the first CSI resource;
    determining a first inter-polarization phase based on the identifier of the first CSI resource, determining a second matrix based on the first inter-polarization phase, wherein the second matrix represents the first inter-polarization phase;

determining a to-be-selected precoding matrix in a first codebook based on the PMI, wherein the first codebook is a preset precoding matrix set; and determining a precoding matrix based on the second matrix and the to-be-selected precoding matrix.

4. The communication method according to claim 3, wherein the N pilot signals correspond to the N inter-polarization phases, and the first inter-polarization phase is one of the N inter-polarization phases.

5. The communication method according to claim 4, wherein the determining the first inter-polarization phase based on the identifier of the first CSI resource comprises:

determining the first CSI resource based on the identifier of the first CSI resource; and determining the first inter-polarization phase corresponding to the first CSI resource.

6. The communication method according to claim 3, further comprising:

sending, configuration information to the terminal device, wherein the configuration information is for configuring a first resource set, the first resource set comprises M CSI resources, the M CSI resources comprise the N CSI resources, and M is an integer greater than or equal to N.

7. An apparatus, comprising:

a processor; and a memory having instructions stored thereon that, when executed by the processor, cause the apparatus to:

receive N pilot signals from a network device by utilizing N channel state information (CSI) resources, wherein the N CSI resources are in a one-to-one correspondence with the N pilot signals, N is an integer greater than or equal to 2, and the N pilot signals correspond to N mapping relationships between antenna ports of the network device and transceiver antennas of the network device, wherein at least two of the N mapping relationships between the antenna ports of the network device and the transceiver antennas of the network device are different, or the N pilot signals correspond to N inter-polarization phases, wherein at least two of the N inter-polarization phases are different;

perform channel measurement on the N CSI resources based on the corresponding pilot signals; and send CSI to the network device, wherein the CSI comprises an identifier of a first CSI resource and a precoding matrix indicator (PMI), the first CSI resource is one of the N CSI resources, a channel measurement result corresponding to the first CSI resource is better than a channel measurement result corresponding to N−1 CSI resources of the N CSI resources other than the first CSI resource, and the identifier of the first CSI resource causes the network device to:

determine a second matrix based on a first inter-polarization phase corresponding to the first CSI resource, wherein the second matrix represents the first inter-polarization phase;

determine a to-be-selected precoding matrix in a first codebook based on the PMI, wherein the first codebook is a preset precoding matrix set; and determine a precoding matrix based on the second matrix and the to-be-selected precoding matrix.

8. The apparatus according to claim 7, wherein the apparatus is further caused to:

receive configuration information from the network device, wherein the configuration information is for configuring a first resource set, the first resource set comprises M CSI resources, the M CSI resources comprise the N CSI resources, and M is an integer greater than or equal to N.

* * * * *